United States Patent [19]

Kaku et al.

[11] Patent Number: 5,537,437
[45] Date of Patent: Jul. 16, 1996

[54] INITIALIZATION EQUALIZATION FOR MODULATION AND DEMODULATION USING SPECIAL TRAINING PATTERN

[75] Inventors: Takashi Kaku; Hiroyasu Murata; Noboru Kawada; Kyoko Hirao; Hideo Miyazawa; Yuri Nigaki, all of Kawasaki, Japan

[73] Assignee: Fujitsu Limited, Kawasaki, Japan

[21] Appl. No.: 505,479

[22] Filed: Jul. 21, 1995

Related U.S. Application Data

[63] Continuation of Ser. No. 108,549, Aug. 19, 1993, abandoned.

[30] Foreign Application Priority Data

Feb. 19, 1993 [JP] Japan .................... 5-030238

[51] Int. Cl.⁶ .................................................... H03H 7/30
[52] U.S. Cl. .................. 375/231; 375/222; 375/266; 375/326; 375/344; 375/345; 375/348; 375/349; 375/368; 370/105.4
[58] Field of Search .................... 375/222, 229–231, 375/266, 295, 326, 344, 345, 348, 349, 364, 368; 370/69.1, 74, 76, 105.4, 106; 348/607; 364/724.09, 724.19, 724.2; 333/28 R, 28 T

[56] References Cited

U.S. PATENT DOCUMENTS 4,571,733  2/1986  Kaku et al. .................... 375/13
4,577,328  3/1986  Senoo ........................... 375/231
4,775,985  10/1988 Busby .......................... 375/114
4,868,850  9/1989  Kaku et al. .................... 375/13
5,140,619  8/1992  Aubie et al. ................... 370/105.4

FOREIGN PATENT DOCUMENTS 0097723  1/1984  European Pat. Off. .

*Primary Examiner*—Stephen Chin
*Assistant Examiner*—Amanda T. Le
*Attorney, Agent, or Firm*—Staas & Halsey

[57] ABSTRACT

A modulation and demodulation system suitable for use with a modem (modulator and demodulator apparatus) of a first polling type. The system allows reproduction of a signal necessary for initialization of a reception section of a modulator and demodulator apparatus with certainty in a short training time. The modulation and demodulation system is constructed such that, upon transmission of data, training data of a particular pattern are modulated and transmitted prior to transmission of the data, and such training data are demodulated by demodulation means and initialization of a reception section of the modulation and demodulation system is performed using the demodulation training data. The pattern of the training data to be transmitted includes an arrangement of signals wherein signals having phases different by 180° from each other are arranged alternately, and a signal having the same phase as the last signal is arranged intermediately.

8 Claims, 15 Drawing Sheets

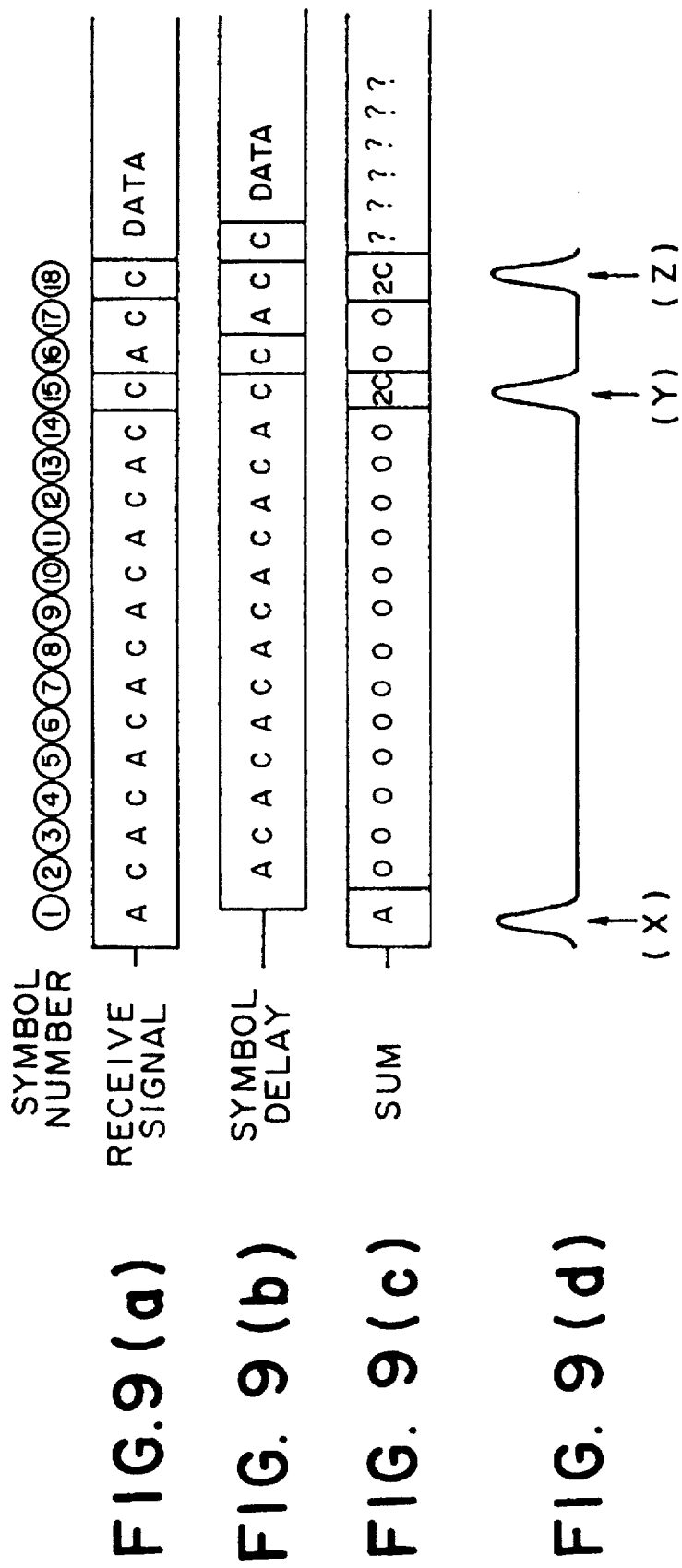

FIG. 10(a) RECEIVE SIGNAL

FIG. 10(b) SYMBOL DELAY

FIG. 10(c) SUM

FIG. 10(d) IMPULSE WAVEFORM

FIG. 11(a) RECEIVE SIGNAL

FIG. 11(b) SYMBOL DELAY

FIG. 11(c) SUM

FIG. 11(d) IMPULSE WAVEFORM

INITIALIZATION EQUALIZATION FOR MODULATION AND DEMODULATION USING SPECIAL TRAINING PATTERN

This is a continuation, of application Ser. No. 08/108, 549, filed Aug. 19, 1993, now abandoned.

BACKGROUND OF THE INVENTION

This invention relates to a modulation and demodulation system suitable for use with a modem (modulator and demodulator apparatus) of the first polling type, and more particularly to a modulation and demodulation system wherein, upon transmission of data, training data of a particular pattern are modulated and transmitted prior to transmission of the data, and such training data are demodulated by demodulation means and initialization equalization processing of a reception section of the modulator and demodulator apparatus is performed using the demodulation training data.

FIG. 13 shows a general construction of an on-line system. Referring to FIG. 13, in the on-line system shown, a plurality of modems 203 are connected to a host computer 201 by way of a communication control apparatus (CCP) 202, and each of the modems 203 is connected by way of an analog circuit 204 to another modem 203' installed at another location. A terminal 205 is connected to each of the modems 203'.

The on-line system further includes a network supervisory apparatus 206, for which a secondary channel is used.

By the way, a state signal of a modem can be transmitted, from each of the host side modems 203 shown in FIG. 13, as it is to the network supervisory apparatus 206, but from each of the terminal side modems 203', a state signal thereof is transmitted to the associated host side modem 203 so that it is transmitted by way of the modem 203 to the network supervisory apparatus 206.

Since a state signal of a modem must necessarily be transmitted without having any influence on main data, each of the modems 203 and 203' divides, for example, a voice band of 0.3 kHz to 3.4 kHz by frequency division to provide a secondary channel for secondary data in addition to a main channel for main data as seen in FIG. 14.

It is to be noted that phase shift keying (PSK), quadrature amplitude modulation (QAM) or some other modulation is used for a main signal while frequency shift keying (FSK) is used for a secondary signal.

Meanwhile, a modem is constructed such that, upon transmission of data, training data of a particular pattern are modulated and transmitted prior to transmission of the data, and such training data are demodulated by demodulation means and initialization processing of a reception section of the modulator and demodulator apparatus is performed using the demodulation training data.

In particular, a modem includes, in its reception section, in addition to a demodulation section, a roll-off filter, an automatic gain control section (AGC), an automatic equalization section (AEQ), a carrier phase correction section (CAPC), a timing extraction section, a carrier detection section and so forth. Those components of the modem must necessarily be initialized upon starting of transmission of data. An optimum signal necessary for such initialization is, for example, a tone signal for an automatic gain control section, an impulse signal for an automatic equalization section, a tone signal or an impulse signal for a carrier phase correction section, a $\pi/\pi$ signal (two signals having phases different by 180° from each other) for a timing extraction section and a tone signal for a carrier detection section.

Therefore, training data of a particular pattern are transmitted so that optimum signals (optimum patterns) may be supplied to the various components of the modem.

An exemplary one of training patterns which satisfy the requirement is shown in FIG. 16($a$). Referring to FIG. 16($a$), the training pattern shown includes a first repeat pattern portion 301 having a signal arrangement wherein signals A and B whose phases of signal points are different by 90° from each other are arranged alternately, and a second repeat pattern portion 302 following the first repeat pattern portion 301 and having a signal arrangement wherein signals B and C whose phases of signal points are different by 180° from those of the signals A and B and different by 90° from each other are arranged alternately.

When signal points of the signals A to D on a phase plane are represented by the same reference characters as those used to represent the signals, if it is assumed that, as shown in FIG. 8($a$), the point P1 represents the pattern A, the point P2 represents the pattern B, the point P3 represents the pattern C and the point P4 represents the pattern D, then the first repeat pattern portion 301 includes an alternate arrangement of the pattern A and the pattern C whose phases of signal points are different by 180° from each other.

It is to be noted that the arrangement of signal points may alternatively be such an arrangement of the points Q1 to Q4 as shown in FIG. 8($b$) or of the points R1 to R4 as shown in FIG. 8($c$).

In order to reproduce an impulse from such a training pattern as shown in FIG. 16($a$), such a circuit as shown in FIG. 15 is used. Referring to FIG. 15, when such a training pattern as shown in FIG. 16($a$) is inputted to the point a in FIG. 15, a delay tap T of a first sum circuit 401 (refer to the point b in FIG. 15) provides such an output as shown in FIG. 16($b$), and consequently, an adder of the first sum circuit 401 (refer to the point c in FIG. 15) provides such an output as shown in FIG. 16($c$). Then, when the output of the first sum circuit 401 (refer to the point c in FIG. 15) is inputted to a second sum circuit 402, a delay tap T of the second sum circuit 402 (refer to the point d in FIG. 15) provides such an output as shown in FIG. 16($d$), and consequently, an adder of the second sum circuit 402 (refer to the point e in FIG. 15) provides such an output as shown in FIG. 16($e$). Then, such a reproduction impulse as shown in FIG. 16($f$) is obtained from the signal of FIG. 16($e$).

It is to be noted that, since a tone component and a $\pi/\pi$ component are included in the training signal of the BABA ... pattern, a tone signal and a $\pi/\pi$ signal can be reproduced by processing the training signal by required calculation processing.

By the way, it is required for modems in recent years to establish multiple point connection in addition to a rise of the communication rate to reduce the cost of the circuit. To this lend, it is an effective technique to divide a frequency band of a main channel into a plurality of bands to transmit a plurality of data by way of the same circuit. However, where the technique is employed, since the roll-off ratio of the main channel is reduced very low, the number of taps of a roll-off filter must be increased, which results in increase of the filter transient. Consequently, the leading-in time of the timing filter is increased so long that a training pattern which has been employed may not possibly allow convergency of the timing phase within the training time. The same subject arises also when it is tried to assure a high modulation rate within a limited available frequency band.

SUMMARY OF THE INVENTION

It is an object of the present invention to provide a modulation and demodulation on system which allows reproduction of a signal necessary for initialization of a reception section of a modulator and demodulator apparatus with certainty in a short training time.

In order to attain the object described above, according to an aspect of the present invention, there is provided a modulation and demodulation system wherein, upon transmission of data, training data of a particular pattern are modulated and transmitted prior to transmission of the data, and such training data are demodulated by demodulation means and initialization of a reception section of the modulation and demodulation system is performed using the demodulation training data, wherein the pattern of the training data to be transmitted includes an arrangement of signals wherein signals whose phases of signal points are different by 180° from each other are arranged alternately, and a signal having the same phase as the last signal is arranged intermediately, and then signals whose phases of signal points are different by 180° from each other are arranged alternately.

According to another aspect of the present invention, there is provided a modulation and demodulation system wherein, upon transmission of main data and secondary data in a plurality of main channels for a plurality of main data and a secondary channel for secondary data obtained by frequency division, training data of a particular pattern are modulated and transmitted prior to transmission of the main data and the secondary data, and such training data are demodulated by demodulation means and initialization of a reception section of the modulation and demodulation system is performed using the demodulation training data, wherein the pattern of the training data to be transmitted includes an arrangement of signals wherein signals whose phases of signal points are different by 180° from each other are arranged alternately, and a signal having the same phase as the last signal is arranged intermediately, and then signals whose phases of signal points are different by 180° from each other are arranged alternately.

Either of the modulation and demodulation systems may be constructed such that the reception section reproduces a first impulse using the first one of those portions of the pattern of the training data in which signals whose phases of signal points are different by 180° from each other are arranged alternately, and then reproduces a second impulse at the intermediate same phase signal portion of the pattern of the training data.

The reception section may reproduce a tone signal using one of those portions of the pattern of the training data in which signals whose phases of signal points are different by 180° from each other are arranged alternately.

Or, the reception section may reproduce a $\pi/\pi$ signal using one of those portions of the pattern of the training data in which signals whose phases of signal points are different by 180° from each other are arranged alternately.

Preferably, the pattern of the training data to be transmitted includes a first repeat pattern portion having a signal arrangement wherein signals whose phases of signal points are different by 180° from each other are arranged alternately, a first same phase signal arrangement portion following the first repeat pattern portion and having another signal arrangement wherein a signal having the same phase as that of the last signal of the first repeat pattern portion is arranged, a second repeat pattern portion following the first same phase signal arrangement portion and having a further signal arrangement wherein signals whose phases of signal points are different by 180° from each other are arranged alternately, and a second same phase signal arrangement portion following the second repeat pattern portion and having a still further signal arrangement wherein a signal having the same phase as that of the last signal of the second repeat pattern portion is arranged.

In this instance, the pattern length of the second repeat pattern portion may have information of a training time after a request-to-send is developed until a notification of a clear-to-send is transmitted.

In the present invention, since the modulation and demodulation system wherein, upon transmission of data, training data of a particular pattern are modulated and transmitted prior the transmission of the data, and such training data are demodulated by demodulation means and initialization of a reception section of the modulation and demodulation system performed using the demodulation training data, constructed such that the pattern of the training data to be transmitted includes an arrangement of signals wherein signals whose phases of signal points are different by 180° from each other are arranged alternately, and a signal having the same phase as the last signal is arranged intermediately, and then signals whose phases of signal points are different by 180° from each other are arranged alternately, there is an advantage in that a signal necessary for initialization of the reception section can be reproduced with certainty in a short training time.

Further, the first portion of the training pattern can be used to reproduce a first impulse and the interval between the first impulse and the second impulse can be increased, and consequently, an impulse can be reproduced with a higher degree of accuracy.

Besides, the interval between the second impulse and the third impulse (the length of the second repeat pattern portion) can be varied by the training pattern, and consequently, setting of a request-to-send to a clear-to-send (RS-CS setting) can be recognized automatically from the length of the second repeat pattern portion.

In addition, upon reproduction of an impulse, an impulse can be reproduced only by summing, and accordingly, there is an advantage in that simplification of the system and the software can be achieved.

Further objects, features and advantages of the present invention will become apparent from the following detailed description when read in conjunction with the accompanying drawings in which like parts or elements are denoted by like reference characters.

BRIEF DESCRIPTION OF THE DRAWINGS

FIGS. 9(a), 9(b), 9(c) and 9(d) are diagrams illustrating a manner of reproduction of an impulse signal using a training pattern by the modem shown in FIG. 3;

FIGS. 10(a), 10(b), 10(c) and 10(d) are diagrams illustrating another manner of reproduction of an impulse signal using a training pattern by the modem shown in FIG. 3;

FIGS. 11(a), 11(b), 11(c) and 11(d) are diagrams illustrating a further manner of reproduction of an impulse signal using a training pattern by the modem shown in FIG. 3;

FIGS. 12(a), 12(b), 12(c) and 12(d) are diagrams illustrating a still further manner of reproduction of an impulse signal using a training pattern by the modem shown in FIG. 3;

DESCRIPTION OF THE PREFERRED EMBODIMENT

Prior to description of a preferred embodiment of the present invention, the principle of the present invention will be described first.

Figure 1:
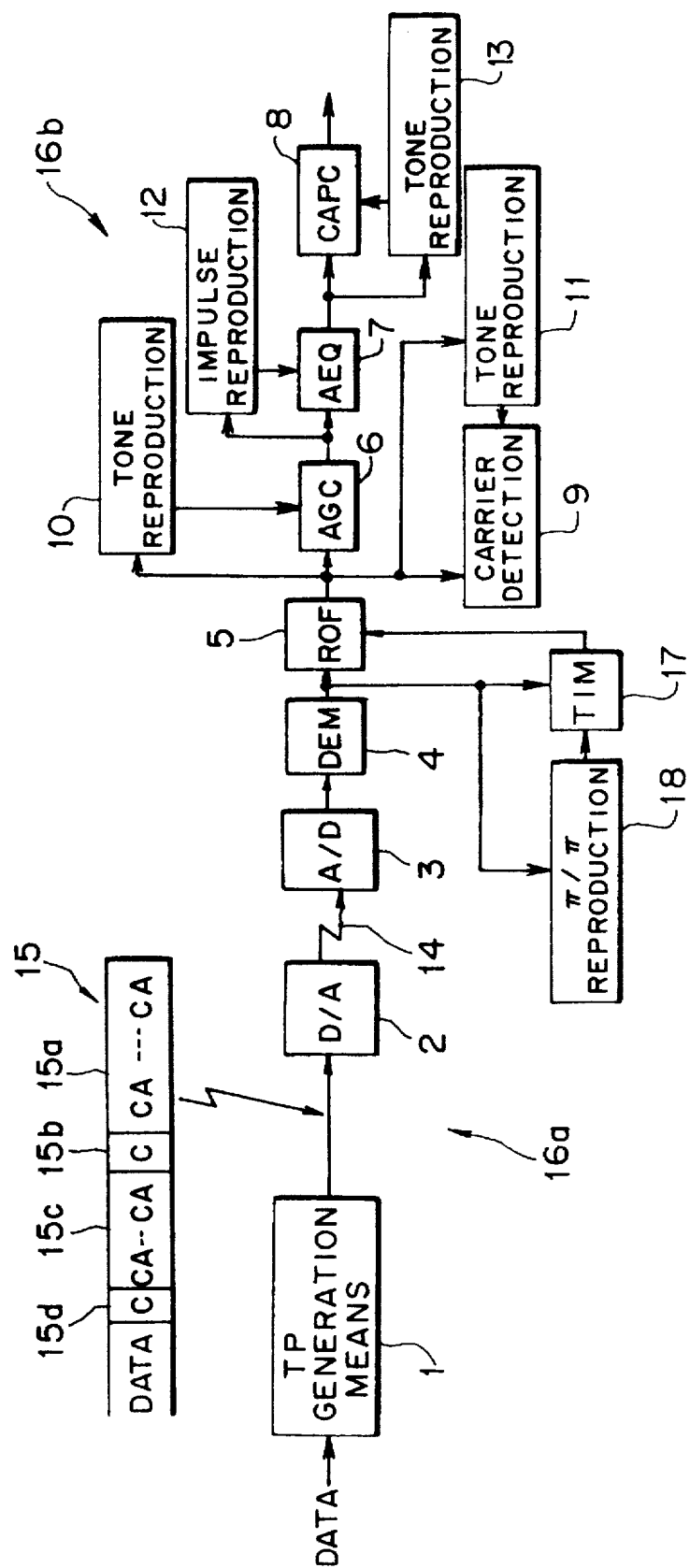
FIG. 1 is a block diagram illustrating the principle of the present invention.

FIG. 1 illustrates, in block diagram, the principle of a modulation and demodulation system of the present invention. Referring to FIG. 1, the modulation and demodulator system shown includes training pattern (TP) generation means 1 for adding training data to data to be transmitted. Data including such training data are transmitted from the training pattern generation means 1 to a reception section 16b of a reception side modem.

Here, a training pattern denotes a signal for initializing various components of the reception section 16b upon starting of transmission of data.

The pattern of training data includes an arrangement of signals wherein signals whose phases of signal points are different by 180° from each other are arranged alternately, and a signal having the same phase as the last signal is arranged intermediately, and then signals whose phases of signal points are different by 180° from each other are arranged alternately.

An exemplary one of such training pattern is shown in FIG. 1. In particular the training pattern 15 shown includes a first repeat pattern portion 15a having a signal arrangement wherein signals whose phases of signal points are different by 180° from each other are arranged alternately, a first same phase signal arrangement portion 15b following the first repeat pattern portion 15a and having another signal arrangement wherein a signal having the same phase as that of the last signal of the first repeat pattern portion 15a is arranged a second repeat pattern portion 15c following the first same phase signal arrangement portion 15b and having a further signal arrangement wherein signals whose phases of signal points are different by 180° from each other are arranged alternately, and a second same phase signal arrangement portion 15d following the second repeat pattern portion 15c and having a still further signal arrangement wherein a signal having the same phase as that of the last signal of the second repeat pattern portion 15c is arranged.

A transmission section 16a of the transmission side modem includes in addition to the training pattern generation means 1, digital to analog (D/A) conversion means 2 for converting digital data in a modulated condition into analog data.

Such analog data are transmitted to the reception side modem by way of an analog transmission line 14.

The reception section 16b of the reception side modem includes analog to digital (A/D) conversion means 3 for converting analog data inputted thereto from the transmission section 16a into digital data, demodulation means 4 for demodulating a signal after conversion into digital data by the A/D conversion means 3, and roll-off filter means 5 for processing a digital demodulation signal from the demodulation means 4 by band separation processing.

The reception section 16b further includes gain control means 6 for controlling the gain of a signal, equalization means 7 for equalizing a reception signal, carrier phase correction means 8 for correcting the phase of a carrier, carrier detection means 9 for detecting a carrier to detect whether or not data have been received, and timing phase reproduction means 17 for leading in the signal timing from the demodulation means 4 to determine where the signal timing is present.

The reception section 16b further includes a pair of tone reproduction means 10 and 11. The tone reproduction means 10 reproduces a tone signal for initializing the gain control means 6 using that portion of a pattern of training data of a demodulation signal outputted from the roll-off filter means 5 in which signals whose phases of signal points are different by 180° from each other are arranged alternately.

Meanwhile the other tone reproduction means 11 reproduces a tone signal for initializing the carrier detection means 9 using that portion of a pattern of training data of a signal outputted from the roll-off filter means 5 in which signals whose phases of signal points are different by 180° from each other are arranged alternately.

The reception section 16b further includes impulse reproduction means 12 which reproduces a first impulse using a first one of those portions of a pattern of training data of a signal outputted from the gain control means 6 in which signals whose phases of signal points are different by 180° from each other are arranged alternately and then reproduces a second impulse at an intermediate same phase signal portion of the signal outputted form the gain control means 6 to initialize the equalization processing means 7.

The reception section 16b further includes a further tone reproduction section 13 which reproduces a tone signal for initializing the carrier phase correction means 8 using that portion of a pattern of training data of a signal outputted from the equalization means 7 in which signals whose phases of signal points are different by 180° from each other are arranged alternately.

The reception section 16b further includes $\pi/\pi$ reproduction means 18 which reproduces a $\pi/\pi$ signal for initializing the timing phase reproduction means 17 using that portion of a pattern of training data of a demodulation signal outputted from the demodulation means 4 in which signals whose phases of signal points are different by 180° from each other are arranged alternately.

In the modulation and demodulation system which employs the special training pattern of the present invention described above, upon transmission of data, training data of the particular pattern are modulated and transmitted prior to transmission of the data, and such training data are demodulated by the demodulation means 4 and initialization of the reception section 16b of the reception side modulator and demodulator apparatus is performed using the demodulation training data.

In this instance, the pattern 15 of the training data employed has an arrangement of signals wherein signals whose phases of signal points are different by 180° from each other are arranged alternately, and a signal having the same phase as the last signal is arranged intermediately, and then signals whose phases of signal points are different by 180° from each other are arranged alternately.

Training data having the pattern described above can be employed also in a modulation and demodulation system wherein upon transmission of main data and secondary data in a plurality of main channels for a plurality of main data and a secondary channel for secondary data obtained by frequency division, training data of a particular pattern are modulated and transmitted prior to transmission of the main data and the secondary data, and such training data are demodulated by demodulation means and initialization of a reception section of the modulation and demodulation system is performed using the demodulation training data.

More particularly, the reception section 16b reproduces a first impulse using the first one of those portions of the pattern 15 of the training data in which signals whose phases of signal points are different by 180° from each other are arranged alternately, and then reproduces a second impulse at the intermediate same phase signal portion of the pattern 15 of the training data.

Further, the reception section 16b can reproduce a tone signal using that portion of the pattern 15 of the training data in which signals whose phases of signal points are different by 180° from each other are arranged alternately.

Furthermore, the reception section 16b can reproduce a π/π signal using that portion of the pattern 15 of the training data in which signals whose phases of signal points are different by 180° from each other are arranged alternately.

Further, the training data can be transmitted with such a pattern that includes the first repeat pattern portion 15a having a signal arrangement wherein signals whose phases of signal points are different by 180° from each other are arranged alternately, the first same phase signal arrangement portion 15b following the first repeat pattern portion 15a and having another signal arrangement wherein a signal having the same phase as that of the last signal of the first repeat pattern portion 15a is arranged, the second repeat pattern portion 15c following the first same phase signal arrangement portion 15b and having a further signal arrangement wherein signals whose phases of signal points are different by 180° from each other are arranged alternately, and the second same phase signal arrangement portion 15d following the second repeat pattern portion 15c and having a still further signal arrangement wherein a signal having the same phase as that of the last signal of the second repeat pattern portion 15c is arranged.

It is to be noted that the pattern length of the second repeat pattern portion 15c has information of a training time after a request-to,send is developed until a notification of a clear-to send is transmitted.

As described above, with the modulation and demodulation system employing the special training pattern according to the present invention, since the modulation and demodulation system wherein, upon transmission of data, training data of a particular pattern are modulated and transmitted prior to transmission of the data, and such training data are demodulated by demodulation means and initialization of a reception section of the modulation and demodulation system is performed using the demodulation training data, is constructed such that the pattern of the training data to be transmitted includes an arrangement of signals wherein signals whose phases of signal points are different by 180° from each other are arranged alternately, and a signal having the same phase as the last signal is arranged intermediately, and then signals whose phases of signal points are different by 180° from each other are arranged alternately, there is an advantage in that a signal necessary for initialization of the reception section can be reproduced with certainty in a short training time.

Further, the first portion of the training pattern can be used to reproduce a first impulse and the interval between the first impulse and the second impulse can be increased, and consequently, an impulse can be reproduced with a higher degree of accuracy.

Besides, the interval between the second impulse and the third impulse (the length of the second repeat pattern portion) can be varied by the training pattern, and consequently, setting of a request-to-send to a clear-to-send (RS-CS setting) can be recognized automatically from the length of the second repeat pattern portion.

In addition, upon reproduction of an impulse, an impulse can be reproduced only by summing, and accordingly, there is an advantage in that simplification of the system and-the software can be achieved.

Figure 2:
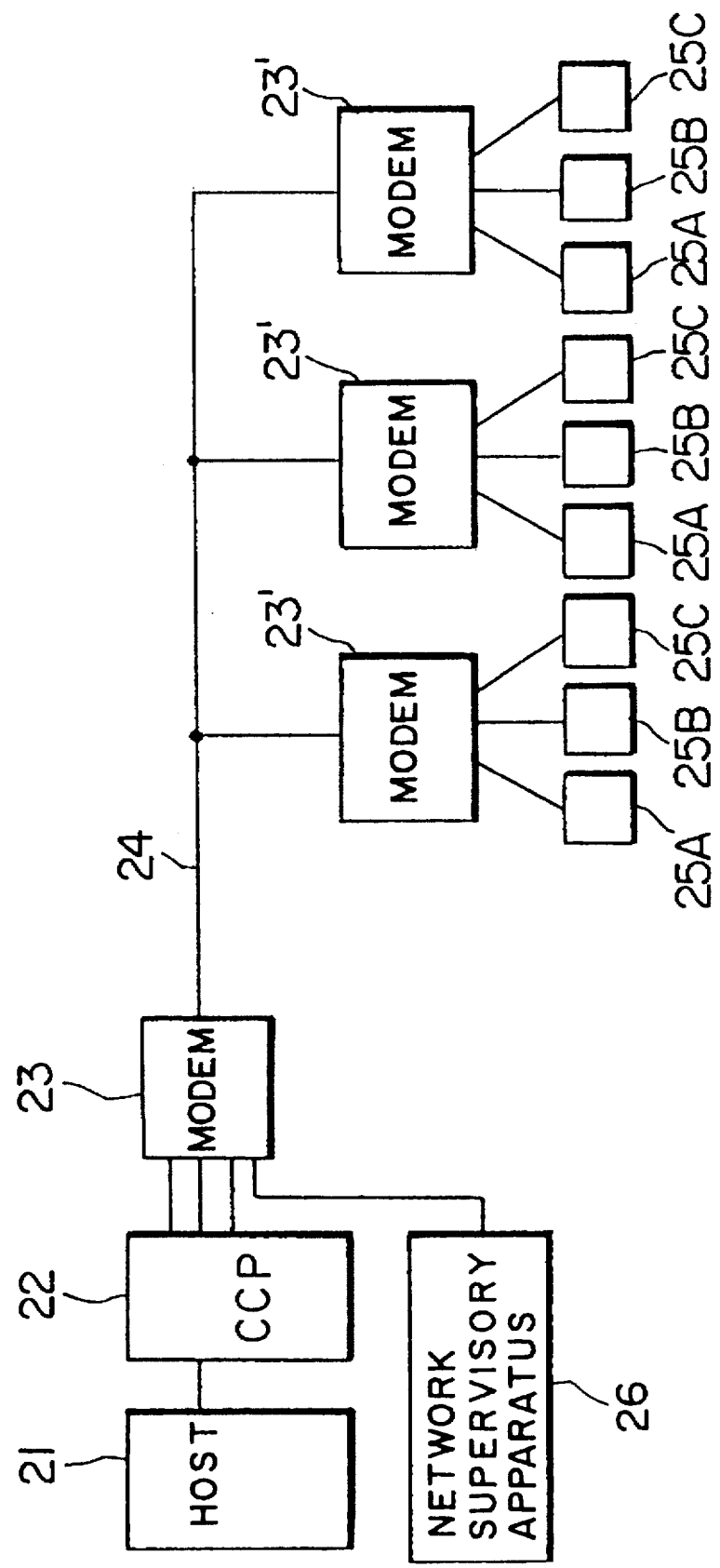
FIG. 2 is a block diagram of an on-line system to which the present invention is applied.

Now, a preferred embodiment of the present invention is described in detail. Referring first to FIG. 2, there is shown an on-line system to which the present invention is applied. The on-line system shown includes a modem 23 connected to a host computer 21 by way of a communication control apparatus (CCP) 22 and serving as a parent station. A plurality of modems 23' are connected to the modem 23 by way of an analog circuit 24. The modems 23' are installed at different locations from the modem 23 and each serves as a child station. A plurality of terminals 25A to 25C are connected to each modem 23'. The On-line system further includes a network supervisory apparatus 26.

Figure 5:
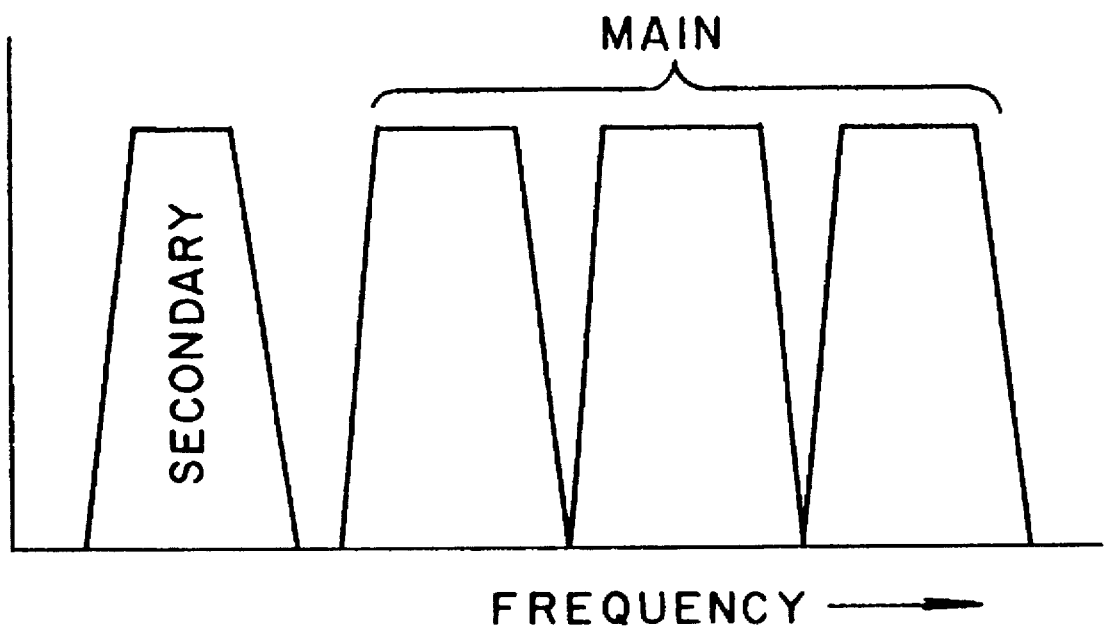
FIG. 5 is a diagram showing frequency bands of a main channel and a secondary channel used in the on-line system of FIG. 2.

Each of the modems 23 and 23' adds, upon transmission, training data having a special training pattern prior to data to be transmitted and modulates and transmits, using, for example, three main channels for main data and a secondary channel for secondary data for network supervision obtained by frequency division as seen from FIG. 5, the data (main data and secondary data), but it demodulates, upon reception, a reception signal to reproduce data (main data and secondary data). Thus, as shown in FIG. 2, the child station modems 23' can be connected by multi-point connection to the parent station modem 23 by way of the common analog circuit 24.

Figure 3:
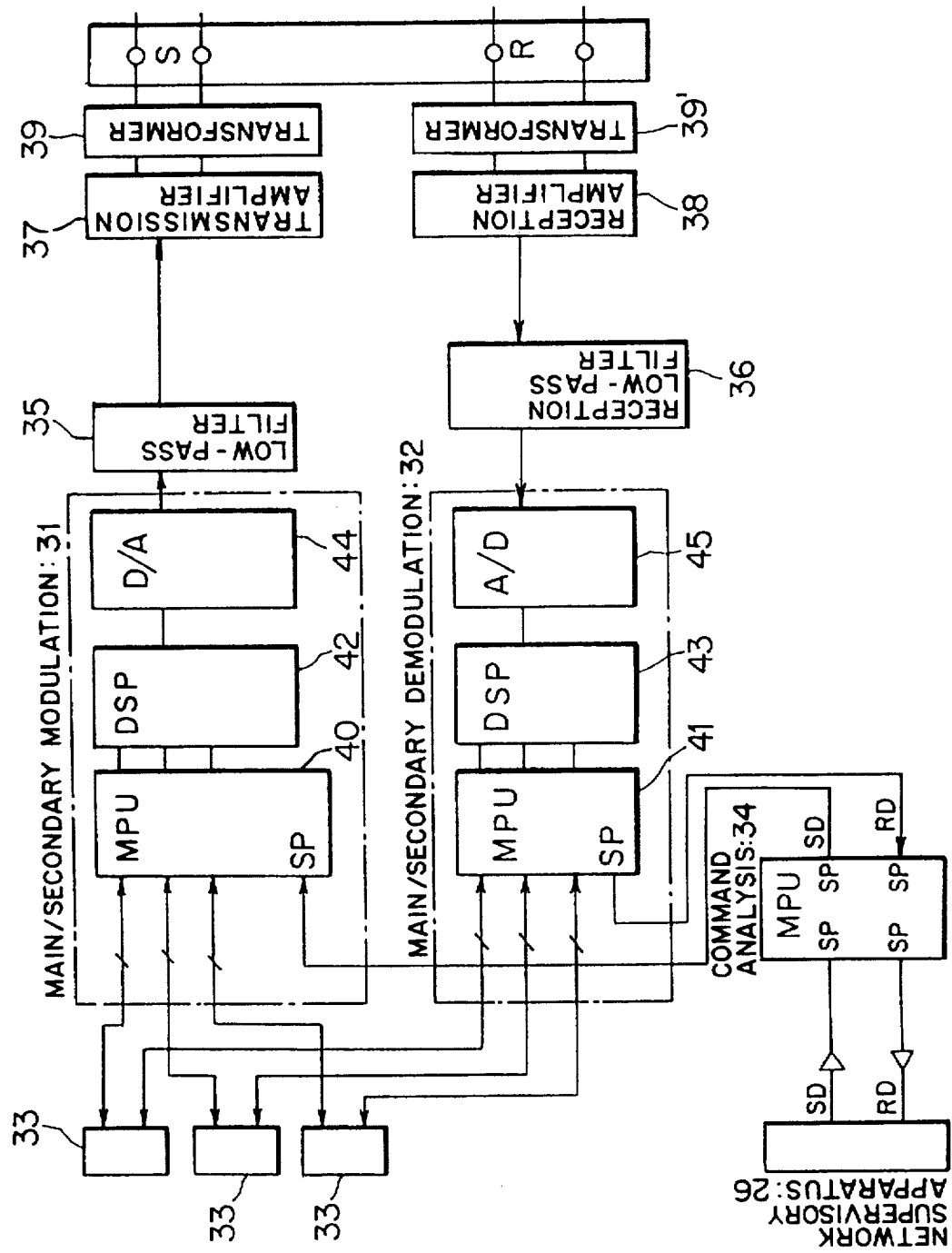
FIG. 3 is a block diagram of essential part of a modem employed in a modulation and demodulation system according to the present invention.

Referring now to FIG. 3, in order for the modem 23 to exhibit such functions as described just above, it includes a main/secondary modulation section 31 and a main/secondary demodulation section 32, and further includes a plurality of interface sections 33 with the communication control apparatus 22, and a command analysis section 34 interposed between the modem 23 and the network supervisory apparatus 26. The modem 23 further includes a transmission low-pass filter 35, a reception low-pass filter 36, a transmission amplifier 37, a reception amplifier 38 and a pair of transformers 39 and 39'.

Each of the interface sections 33 connects the communication control apparatus 22 and the modem 23 to each other with a synchronous interface (RS232C). The command analysis section 34 performs an analysis of a command from the network supervisory apparatus 26 and production of a response to the network supervisory apparatus 26 and has a function of transferring transmission or reception data SD or RD by way of serial ports SP thereof by high speed serial transfer. Further, the command analysis section 34 connects the network supervisory apparatus 26 and the modem 23 to each other with a start-stop interface (RS485).

The main/secondary modulation section 31 includes a microprocessor unit (MPU) 40, a digital signal processor (DSP) 42 and a digital to analog (D/A) converter 44. The main/secondary demodulation section 32 includes an MPU 41, a DSP 43 and an analog to digital (A/D) converter 45. The MPUs and DSPs forming the main/secondary modulation section 31. The main/secondary demodulation section 32 may individually be provided by suitable plural numbers of MPUs and DSPs depending upon the capacity or processing faculty of the modem 23.

Figure 4:
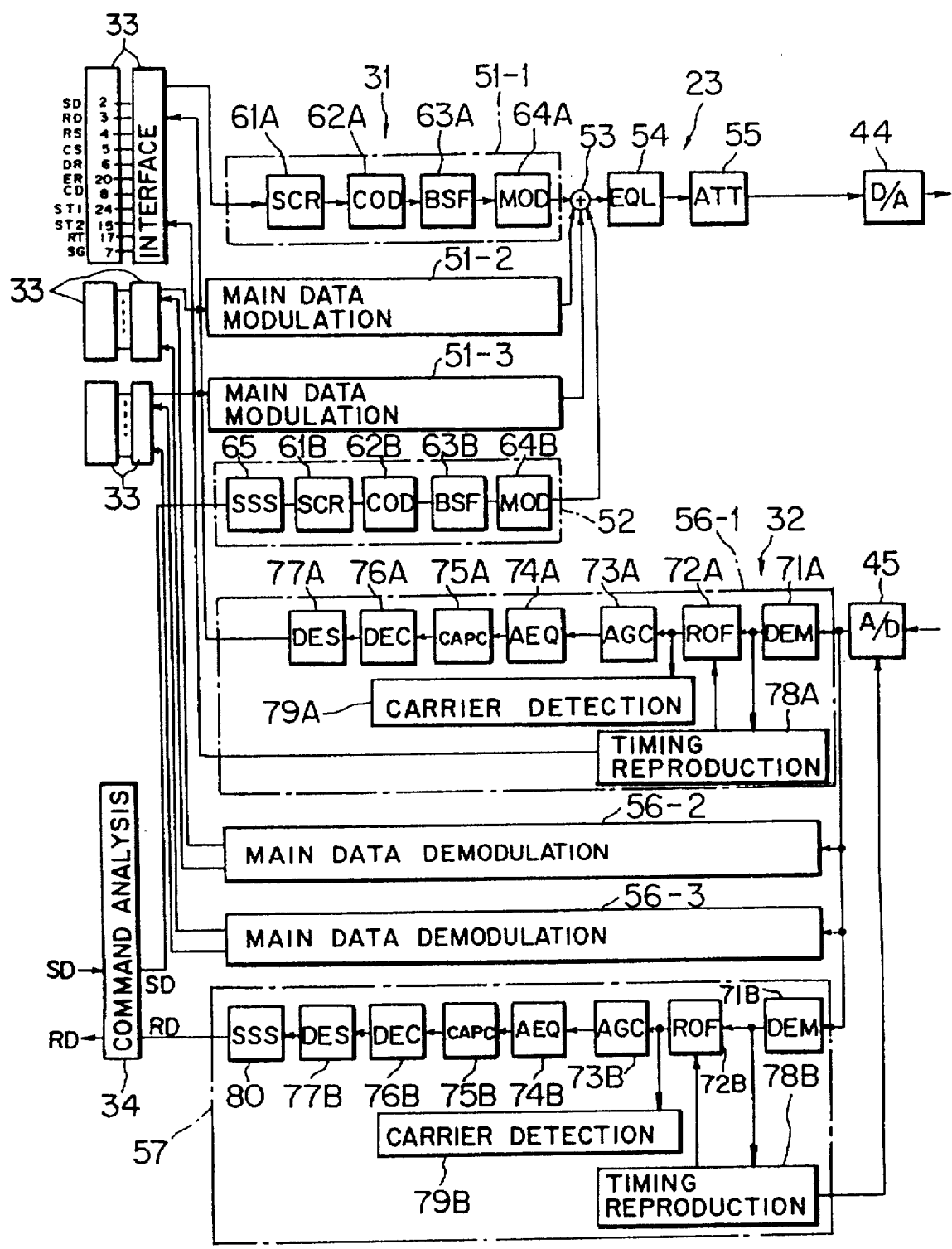
FIG. 4 is a block diagram showing details of the modem shown in FIG. 3.

Now, an essential part of the modem 23 will be described in more detail. Referring now to FIG. 4, the modem 23 includes, in the main/secondary modulation section 31, three main data modulation sections 51-1, 51-2 and 51-3 and a secondary data modulation section 52 as well as an addition section 53, a fixed equalizer 54 and a transmission attenuator 55.

The main data modulation section 51-1 to 51-3 modulate main data and are equal in number to the number of channels, for example, 3. Each of the main data modulation sections 51-1 to 51-3 includes a scrambler 61A, a code conversion section 62A, a transmission base band filter 63A and a modulation section 64A. It is to be noted that, while the detailed construction is shown only of the main data modulation section 51-1 in FIG. 4, also the other main data modulation sections 51-2 and 51-3 have the same construction as described above.

Here, the scrambler 61A scrambles a signal into a random signal, and the code conversion section 62A performs desired code conversion for the output of the scrambler 61A.

The transmission base band filter 63A passes a base band component of a digital output of the code conversion section 62A, and the modulation section 64A modulates the output of the base band filter 63A with a corresponding main channel frequency.

Meanwhile, the secondary data modulation section 52 modulates secondary data and includes a start-stop synchronization conversion section 65, a scrambler 61B, a code conversion section 62B, a transmission base band filter 63B, and a modulation section 64B.

Here, the start-stop synchronization conversion section 65 performs conversion processing from a start-stop interface to a synchronization interface, and the scrambler 61B, the code conversion section 62B, the transmission base band filter 63B and the modulation section 64B have similar functions to those of the scrambler 61A, the code conversion section 62A, the transmission base band filter 63A and the modulation section 64A, respectively. It is to be noted that the modulation frequency at the modulation section 64B is the secondary channel frequency.

It is to be noted that the transmission MPU 40 shown in FIG. 3 has the functions of the scramblers 61A and the code conversion sections 62A of the main data modulation sections 51-1 to 51-3 and the start-stop synchronization conversion section 65, the scrambler 61B and the code conversion section 62B of the secondary data modulation section 52, and the transmission DSP 42 shown in FIG. 3 has the functions of the transmission base band filters 63A and the modulation sections 64A of the main data modulation sections 51-1 to 51-3. The transmission base band filter 63B and the modulation section 64B of the secondary data modulation section 52, the addition section 53, the fixed equalizer 54 and the transmission attenuator 55.

Further, the modem 23 includes, in the main/secondary modulation section 32, three main data demodulation sections 56-1, 56-2 and 56-3 and a secondary data demodulation section 57.

The main data demodulation sections 56-1 to 56-3 demodulate main data and are equal in number to the number of channels, for example, 3. Each of the main data demodulation, sections 56-1 to 56-3 includes a demodulation section 71A, a roll-off filter (band separation filter) 72A, an automatic gain control section 73A, an automatic equalization section 74A, a carrier phase correction section 75A, a code conversion section 76A and a descrambler 77A as well as a timing reproduction section 78A and a carrier detection section 79A. It is to be noted that, while only the detailed construction is shown only of the main data demodulation section 56-1 in FIG. 4, also the other main data demodulation sections 56-2 and 56-3 have the same construction as described above.

Here, the demodulation section 71A applies demodulation processing to a reception signal after digital conversion by the A/D converter 45, and the roll-off filter 72A passes only a signal of a predetermined frequency range of the digital output of the demodulation section 71A. A transversal filter is used for the demodulation section 71A. Further, where the main channel is divided into a plurality of (three) channels as in the present embodiment, the frequency cut-off characteristic of the roll-off filter 72A must necessarily be set steep from the necessity to narrow the band widths to make a rigid distinction between each adjacent frequencies, and to this end, the roll-off rate (ROF Fate) of the roll-off filter 72A is set low (for example, to 3 to 5% or so).

The automatic gain control section 73A includes automatic reception level adjustment means for adjusting the loop gain so that the level of the demodulation signal band-limited by the roll-off filter 72A may be equal to a predetermined reference value and inputting the modulation signal to the automatic equalization section 74A at the next stage. The automatic gain control section 73A is required to allow the automatic equalization section 74A at the next stage to operate accurately.

The automatic equalization section 74A performs equalization processing for correcting a transmission distortion and so forth of the circuit. The carrier phase correction section 75A corrects the phase of a carrier from the output of the automatic equalization section 74A. The code conversion section 76A decodes a coded signal of the output of the carrier phase correction section 75A. The descrambler 77A descrambles an output of the code conversion section 76A, which is in a scrambled condition as a result of processing at the scrambler 61A in the main/secondary modulation section 31, back into an original signal.

The timing reproduction section 78A extracts a signal timing from the output of the demodulation section 71A and determines where a signal timing is present. The output of the timing reproduction section 78A is supplied to the roll-off filter 72A and the corresponding interface circuit 33.

The carrier detection section 79A detects a carrier to detect whether data have been received, and the output of the carrier detection section 79A is supplied to a sequencer not shown and thus provides trigger information to the sequencer.

Meanwhile, the secondary data demodulation section 57 demodulates secondary data and includes a demodulation section 71B, a roll-off filter (band separation filter) 72B, an automatic gain control section 73B, an automatic equalization section 74B, a carrier phase correction section 75B, a code conversion section 76B, a descrambler section 77B, and a synchronization to start-stop conversion section 80 as well as a timing reproduction section 78B and a carrier detection section 79B.

Here, the synchronization to start-stop conversion section 80 performs conversion processing from a synchronization interface to a start-stop interface, and the demodulation section 71B, the roll-off filter 72B, the automatic gain control section 73B, the automatic equalization section 74B, the carrier phase correction section 75B, the code conversion section 76B, the descrambler section 77B, the timing reproduction section 78B and the carrier detection section 79B have similar functions to those of the demodulation section 71A, the roll-off filter 72A, the automatic gain control section 73A, the automatic equalization section 74A, the carrier phase correction section 75A, the code conversion section 76A, the descrambler section 77A, the timing reproduction section 78A and the carrier detection section 79A, respectively.

However, the roll-off filter 72B of the secondary data demodulation section 57 need not necessarily have a steep frequency cut-off characteristic since the secondary channel is not divided any more, and accordingly, the roll-off rate (ROF rate) of the roll-off filter 72B is set high comparing with the roll-off filters 72A for the main channels, for example, to 30 to 40 %.

Meanwhile, the timing reproduction section 78B of the secondary data demodulation section 57 extracts a signal timing from the output of the demodulation section 71B and determines where a signal timing is present. Then, the output of the timing reproduction section 78B is supplied to the roll-off filter 72B and the A/D converter 45. Accordingly, the frequency timing of the secondary data is used as a sampling timing for a digital value by the A/D converter 45. The reason why the frequency timing of the secondary data is used as a sampling timing for a digital value by the A/D converter 45 is that the ROF rate in the main channels is so low that it is difficult to extract a timing component from any of the main channels.

It is to be noted that the reception DSP 43 shown in FIG. 3 has the functions of the demodulation sections 71A, the roll-off filters 72A, the automatic gain control sections 73A, the automatic equalization sections 74A, the carrier phase correction sections 75A, the timing reproduction sections 78A and the carrier detection sections 79A of the main data demodulation sections 56-1 to 56-3 and the demodulation section 71B, the roll-off filter 72B, the automatic gain control section 73B, the automatic equalization section 74B, the carrier phase correction section 75B, the timing reproduction section 78B and the carrier detection section 79B of the secondary data demodulation section 57, and the reception MPU 41 shown in FIG. 3 has the functions of the code conversion sections 76A and the descramblers 77A of the main data demodulation sections 56-1 to 56-3 and the code conversion section 75B, the descrambler 77B and the synchronization to start-stop conversion section 80 of the secondary data demodulation section 57.

It is to be noted that also the modems 23' serving as child stations have substantially the same construction as the modem 23 serving as the parent station.

By the way, in the present embodiment, when main data and secondary data are to be transmitted in a plurality of main channels and a secondary channel obtained by frequency division, training data (data for initialization of the reception side modem upon transmission) having a special training pattern are generated prior to the data to be transmitted by code conversion by the code conversion sections 62A and 62B of the transmission systems for the main channels and the secondary channel.

When such training data are received by the reception side modem, signals for initialization are reproduced in accordance with the training pattern so that several components of the reception side modem are initialized.

Figure 6:
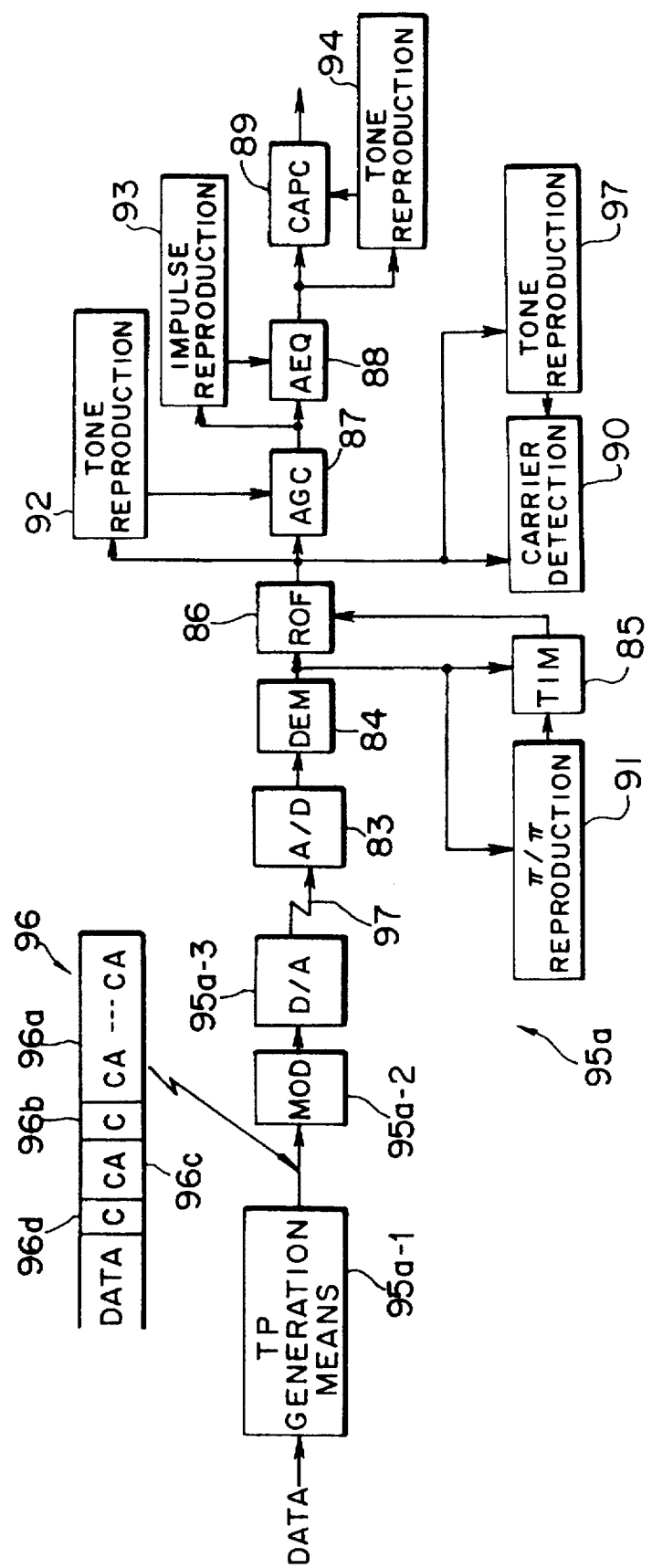
FIG. 6 is a block diagram illustrating a manner of production of training data in the modem shown in FIG. 3 and initialization performed for components of a reception side modem.

FIG. 6 illustrates a manner of generation of training data to main data of one of the main channels to be transmitted from a transmission side modem 95a and initialization processing performed for several portions of a reception side modem 95b.

Referring to FIG. 6, the transmission side modem 95a includes training pattern generation means 95a-1 which adds, for example, a training pattern 96 prior to data to be transmitted. When, for example, the modem 23 shown in FIG. 4 is the transmission side modem, the code conversion section 62A corresponds to the training pattern generation means 95a-1.

Here, the training pattern 96 includes a first repeat pattern portion 96a, a first same phase signal arrangement portion 96b, a second repeat pattern portion 96c and a second same phase signal arrangement portion 96d.

Figure 8A:
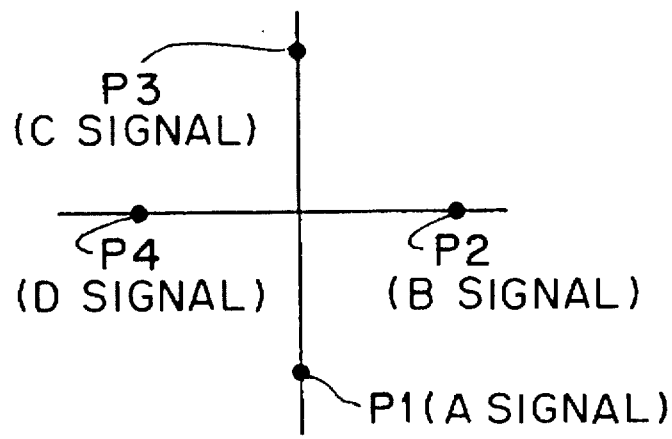
FIGS. 8(a), 8(b) and 8(c) are diagrams showing different arrangements of signal points.

If it is assumed that, for example, in FIG. 8(a) which shows an arrangement of signal points on a phase plane, the point P1 represents a pattern A, the point P2 represents another pattern B, the point P3 represents a further pattern C and the point P4 represents a still further pattern D, the first repeat pattern portion 96a has a signal arrangement wherein the pattern A and the pattern C whose phases of signal points are different by 180° from each other are arranged alternately.

Meanwhile, the first same phase signal arrangement portion 96b follows the first repeat pattern portion 96a and includes another signal arrangement wherein the pattern C having the same phase as the pattern C of the last signal of thee first repeat pattern portion 96a is arranged. The second repeat pattern portion 96c follows the first same phase signal arrangement portion 96b and includes a further signal arrangement wherein the pattern C and the pattern A whose phases of signal points are different by 180° from each other are arranged alternately. The second same phase signal arrangement portion 96d follows the second repeat pattern portion 96c and includes a still further signal arrangement wherein a signal having the same phase as that of the last signal of the second repeat pattern portion 96c is arranged.

It is to be noted that a modulation section 95a-2 and a digital to analog (D/A) converter 95a-3 of the transmission side modem 95a and an A/D converter 83 of the reception side modem 95b have similar functions to those of the modulation section 64A, the D/A converter 44 and the A/D converter 45, respectively, of the modem 23 shown in FIG. 4, and accordingly, overlapping description of them is omitted herein to avoid redundancy.

Similarly, while the reception side modem 95b includes a demodulation section 84, a timing reproduction section 85, a roll-off filter 86, an automatic gain control section 87, an automatic equalization section 88, a carrier phase correction section 89 and a carrier detection section 90, since they have similar functions to those of the demodulation section 71A, the timing reproduction section 78A, the roll-off filter 72A, the automatic gain control section 73A, the automatic equalization section 74A, the carrier phase correction section 76A and the carrier detection section 90 described hereinabove with reference to FIG. 4, respectively, and accordingly, overlapping description of them is omitted herein.

Here, in initialization of the components of the reception side modem 95b which is performed prior to inputting of data, the timing reproduction section 86 is initialized in response to an input of a π/π signal. The automatic gain control section 87, the carrier phase correction section 89 and the carrier detection section 90 are initialized in response to an input of a tone signal. The automatic equalization section 88 is initialized in response to an input of an impulse signal.

The reception side modem 95b thus includes π/π signal reproduction means 91 which extracts a particular training pattern from a signal including a demodulation training signal obtained by demodulation processing of a transmission signal from the transmission side modem 95a. The reception side modem 95b then reproduces a π/π signal from the training pattern and initializes the timing reproduction section 85 with the π/π signal.

For example, when a signal wherein such a training signal as the training pattern 96 is added prior to data to be transmitted is inputted to the reception side modem 95b, the π/π signal reproduction means 91 extracts, from a demodulation signal outputted from the demodulation section 84, a signal portion such as the first repeat pattern portion 96a of the training pattern 96 and utilizes the thus extracted signal portion to reproduce a π/π signal to initialize the timing reproduction section 85.

The reception side modem 95b further includes an automatic gain control section gone reproduction section 92 which extracts a particular training pattern from a signal including a demodulation training signal obtained by demodulation processing and band separation processing of a transmission signal from the transmission side modem 95a. The automatic gain control section tone reproduction section 92 reproduces a tone signal from such extracted training pattern to initialize the automatic gain control section 87.

For example, if such a reception signal as the training pattern 96 is inputted from the transmission side modem 95a, then the automatic gain control section tone reproduction section 92 extracts a signal portion of the first repeat pattern portion 96a of the training pattern 96 from a signal obtained by demodulation processing and band separation processing. Then, the automatic gain control section tone reproduction section 92 reverses one of the two different phase signals of the extracted signal portion to convert the repeat pattern into a continuous pattern to reproduce it as a tone signal to initialize the automatic gain control section 87.

The reception side modem 95b further includes a carrier detection section tone generation section 97 which extracts a particular training pattern similarly as in the case of the automatic gain control section tone reproduction section 92 described above and reproduces a tone signal using the training pattern to initialize the carrier detection section 90.

The reception side modem 95b further includes a carrier phase correction section tone reproduction section 94 which extracts a particular training pattern from an output signal of the automatic equalization section 88 similarly as described above and reproduces a tone signal using the training pattern to initialize the carrier phase correction section 89.

The reception side modem 95b further includes an automatic equalization section impulse reproduction section 93 which extracts a particular training pattern from an output signal of the automatic gain control section 87 and reproduces an impulse signal using the training pattern to initialize the automatic equalization section 88.

Figure 7:
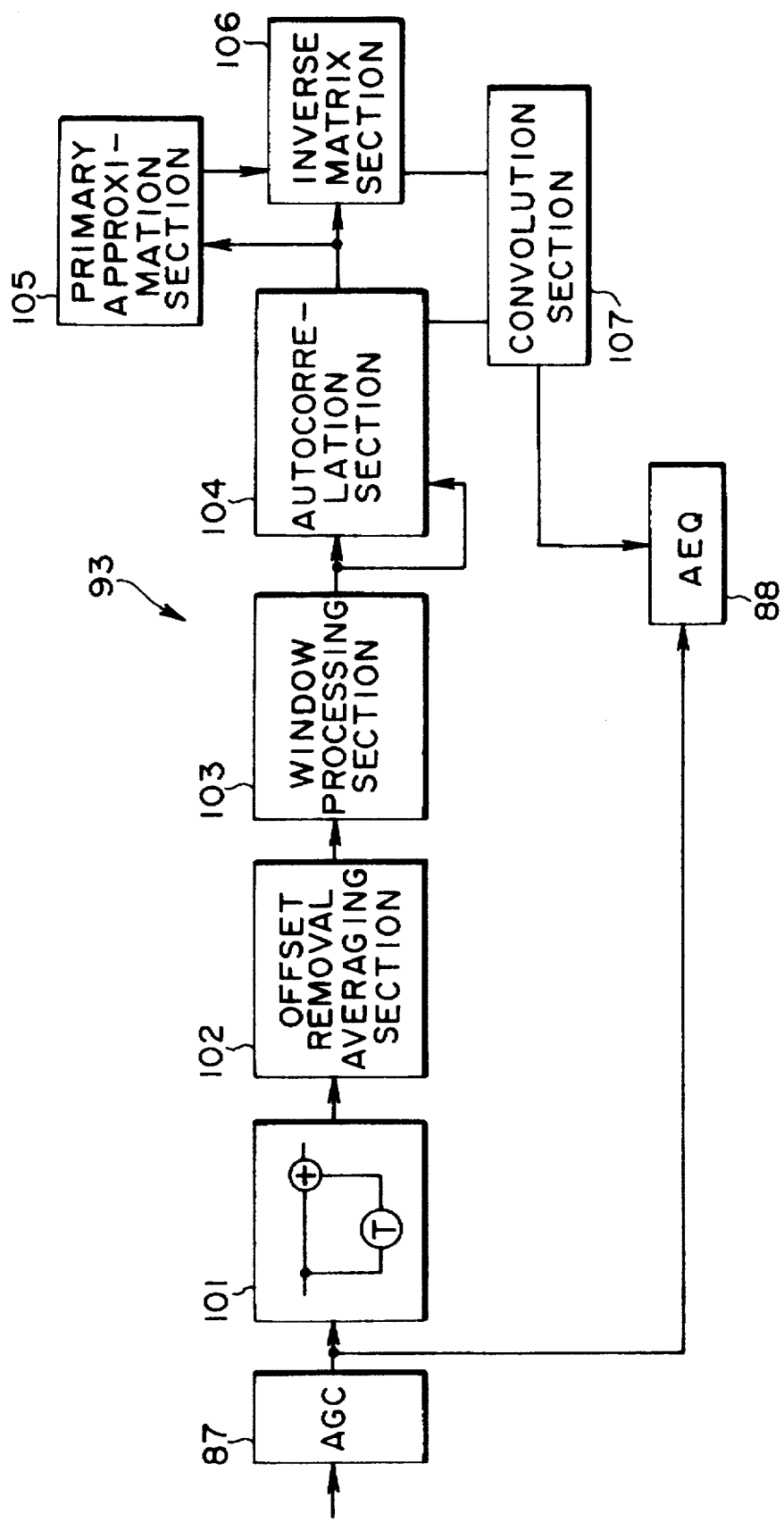
FIG. 7 is a block diagram showing a somewhat detailed construction of an impulse reproduction section for an automatic equalization section of the modem shown in FIG. 3.

FIG. 7 shows a somewhat detailed construction of the automatic equalization section impulse reproduction section 93. Referring to FIG. 7, the automatic equalization section impulse reproduction section 93 includes a sum circuit 101 which delays a signal from the automatic gain control section 87, for example, by a one symbol period and takes and outputs a sum between the delayed signal and the signal from the automatic gain control section 87, an offset removal averaging section 102 for removing a frequency offset, a window processing section 103 for applying window processing to a signal from the offset removal averaging section 102, an autocorrelation section 104, a primary approximation section 105, an inverse matrix section 106, a convolution section 107 for performing convolution calculation in accordance with the output of the autocorrelation section 104 and the output of the inverse matrix section 106 and outputting an impulse signal to the automatic equalization section 88, and so forth.

With the modulation and demodulation system of the construction described above, upon transmission, individual main data are modulated in the respective main channels by the main data modulation sections 51-1 to 51-3 (see FIG. 4) while secondary data are modulated in the secondary channel by the secondary data modulation section 52, and the outputs of the modulation sections 51-1 to 51-3 and 52 are added by the adder 53, processed by necessary processing successively by the fixed equalizer 54 and the transmission attenuator 55, converted into an analog signal by the D/A converter 44 and then sent into the analog circuit.

In this instance, training data (data for initialization of the reception side modem upon transmission) having a training pattern described below are generated prior to data to be transmitted, for example, by code conversion by the code conversion section 62A of the main data modulation section 51-1. In the following, a transmission/reception operation of the modulator and demodulation apparatus will be described with reference to FIG. 6.

In particular, training data are generated as the training pattern 96 prior to data to be transmitted, for example, using the pattern A (point P1) shown in FIG. 8(a) and the pattern C (point P3) having a phase different by 180° from that of the pattern A.

Then, the modulation section 95a-2 modulates the training data 96 and the data to be transmitted, and the output data of the modulation section 95a-2 are converted into an analog signal by the D/A converter 95a-3. The analog data are transmitted as a transmission signal to the reception side modem 95b by way of an analog transmission line 97.

Then, on the reproduction side modem 95b, the reception signal from the transmission side modem 95a is converted from an analog signal into a digital signal by the A/D converter 83, and such reception digital signal is processed by demodulation processing by the demodulation section 84.

Thereafter, the demodulation digital signal having been processed by demodulation processing is processed by band separation processing by the roll-off filter 86. Meanwhile, the timing reproduction section 85 inputs the demodulation digital signal from the demodulation section 84, extracts a timing phase and performs determination of the timing phase.

In this instance, before the demodulation digital signal to be received is inputted to the timing reproduction section 85, the π/π signal reproduction section 91 reproduces a π/π signal and inputs it to the timing reproduction section 85 to initialize the timing reproduction section 85.

As a reproduction method of such π/π signal, the π/π signal reproduction section 91 extracts a signal portion of the training pattern 96 such as the first repeat pattern portion 96a from the demodulation signal outputted from the demodulation section and reproduces a π/π signal making use of the signal portion.

Then, after band separation processing is performed by the roll-off filter 86, the automatic gain control section 87 adjusts the loop gain so that the level of the band-limited demodulation signal may be a predetermined reference value.

In this instance, before the band-limited demodulation signal is inputted to the automatic gain control section 87, a tone signal is reproduced by the automatic gain control section tone reproduction section 92 and inputted to the automatic gain control section 87 to initialize the latter.

As a method of reproducing such tone signal, the automatic gain control section tone reproduction section 92 extracts a signal portion of the training pattern 96 at the first repeat pattern portion 96a from the signal having been processed by demodulation processing and band separation processing. Then, one of the different phase patterns A and C forming the first repeat pattern portion 96a is reversed in phase to convert the repeat pattern into a continuous pattern to reproduce a tone signal.

By the way, whereas the carrier detection section 90 inputs the band-limited demodulation signal and detects a carrier to detect whether or not data have been received, before the band-limited demodulation signal is inputted to the carrier detection section 90, a tone signal is reproduced by the carrier detection section tone signal reproduction section 97 and inputted to the carrier detection section 90 to initialize the latter.

Here, the method of reproducing a tone signal which is executed by the carrier detection section tone reproduction section 97 is similar to that by the automatic gain control section tone reproduction section 92, and accordingly, overlapping description thereof is omitted herein.

Further, after the loop gain is adjusted by the automatic gain control section 87 so that the level of the band-limited demodulation signal may be the predetermined reference value, equalization processing for correcting a transmission distortion of the circuit and so forth is performed by the automatic equalization section 88, and in this instance, before the signal from the automatic gain control section 87 is inputted to the automatic equalization section 88, an impulse signal is reproduced by the automatic equalization section impulse signal reproduction section 93 and inputted to the automatic equalization section 88 to initialize the latter.

By the way, the method of reproducing an impulse signal which is executed by the automatic equalization section impulse signal reproduction section 93 will be described with reference to FIGS. 7, 9(a), 9(b), 9(c) and 9(d).

In particular, when the reception signal from the automatic gain control section 87 is inputted (refer to FIG. 9(a)), the sum circuit 101 delays the reception signal by one symbol period (refer to FIG. 9(b)), takes a sum between the delayed signal and the signal from the automatic gain control section 87 and then outputs the resultant sum signal (refer to FIG. 9(c)).

Thereafter, the sum signal is successively processed by required processing by the offset removal averaging section 102 to the convolution section 107 to reproduce such an impulse as seen in FIG. 9(d).

Here, the interval between the first impulse ((X) in FIG. 9(d)) and the second impulse ((Y) in FIG. 9(d)) includes frequency offset information, and a sufficient interval can be taken in the training signal by making the first repeat pattern portion 96a long.

Meanwhile, the interval between the second impulse ((Y) in FIG. 9(d)) and the third impulse ((Z) in FIG. 9(d)) depends upon the set length of the training data and the length of the first repeat pattern portion 96a and accordingly can be varied by the training pattern.

Accordingly, if such a reception signal as seen in, for example, FIG. 10(a), 11(a) or 12(a) is inputted, then the sum circuit 101 delays the reception signal by a one symbol period as seen from FIG. 10(b), 11(b) or 12(b) and takes a sum between the delayed signal and the inputted reception signal so that it outputs such a signal as seen from FIG. 10(c), 11(c) or 12(c).

Thereafter, the sum signal is successively processed by required processing by the offset removal averaging section 102 to the convolution section 107 so that such an impulse as seen from FIG. 10(d), 11(d) or 12(d) is reproduced by the automatic equalization section impulse signal reproduction section 93.

By the way, after the automatic equalization section 88 performs equalization processing for correcting a transmission distortion of the circuit and so forth, the carrier phase correction section 89 performs correction of the carrier phase, and in this instance, before the signal from the automatic equalization section 88 is inputted to the carrier phase correction section 89, a tone signal is reproduced by the carrier phase correction section tone reproduction section 94 and inputted to the carrier phase correction section 89 to initialize the latter.

It is to be noted that the method of reproducing a tone signal which is executed by the carrier phase correction section tone reproduction section 94 is similar to that by the automatic gain control section tone reproduction section 92, and accordingly, overlapping description thereof is omitted herein.

In this manner, in the present embodiment, since the pattern of the training data to be transmitted includes an arrangement of signals wherein signals whose phases of signal points are different by 180° from each other are arranged alternately and a signal having the same phase as the last signal is arranged intermediately and then signals whose phases of signal points are different by 180° from each other are arranged alternately, there is an advantage in that any of an impulse signal, a tone signal and a π/π signal which are signals necessary for initialization of the reception section can be reproduced with certainty in a short training time using that portion of the pattern of the training data in which signals whose phases of signal points are different by 180° from each other are arranged alternately.

For example, by broadening the valley between impulses, the influence of an impulse at a point at which a timing phase is extracted can be reduced, and consequently, a timing phase can be extracted with a higher degree of accuracy.

Then, the interval between the first impulse and the second impulse with the first impulse reproduced from the first portion of the training pattern can be increased, and reproduction of an impulse can be performed with a higher degree of accuracy.

Further, the interval between the second impulse and the third impulse (the length of the second repeat pattern portion 96c) can be varied by the training pattern as seen from FIGS. 9(a), 9(b), 9(c) and 9(d) to FIGS. 12(a), 12(b), 12(c) and 12(d), and consequently, setting of a request-to-send to a clear-to-send (RS-CS setting) can be recognized automatically from the length of the second repeat pattern portion 96c.

In addition, upon reproduction of an impulse, an impulse can be reproduced only by summing, and accordingly, there is an advantage in that simplification of the system and the software can be achieved.

Figure 8B:
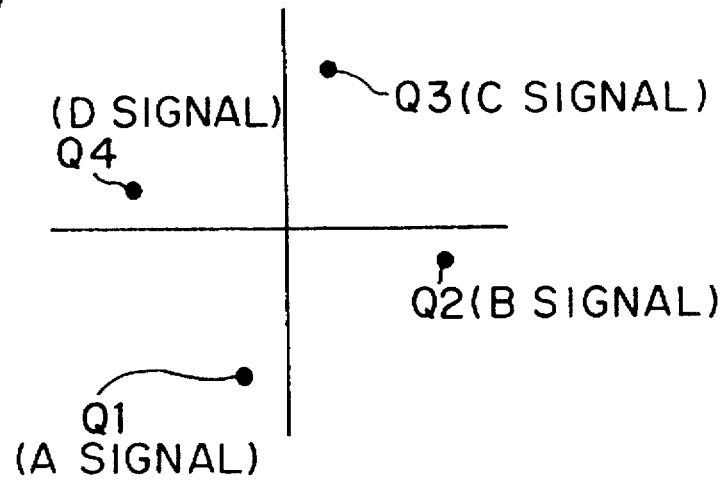
Figure 8C:
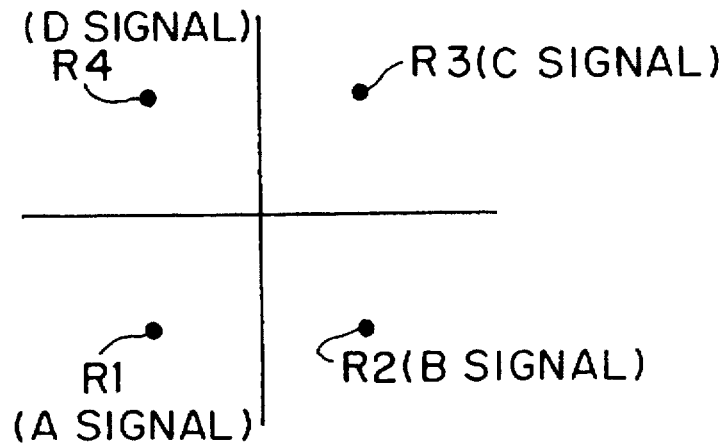
Figure 13:
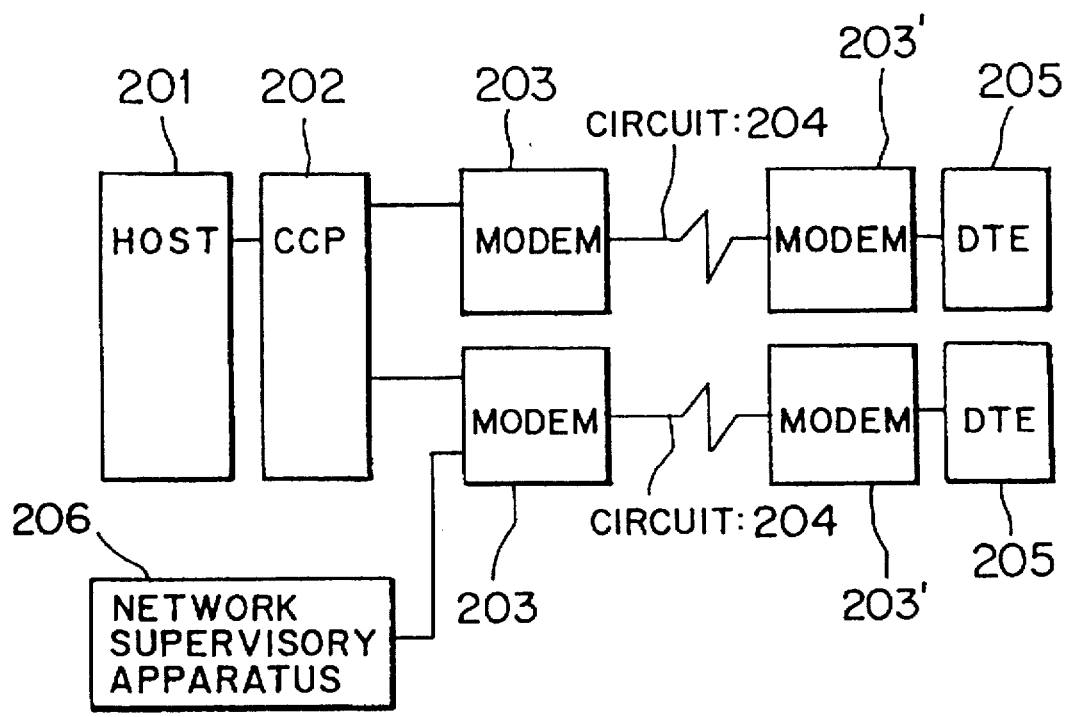
FIG. 13 is a block diagram showing an on-line system.
Figure 14:
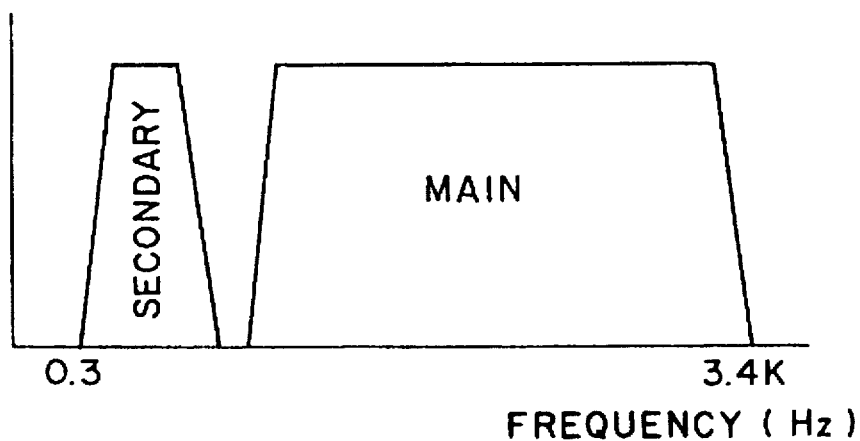
FIG. 14 is a diagram showing frequency bands of a main channel and a secondary channel used in the on-line system shown in FIG. 13.
Figure 15:
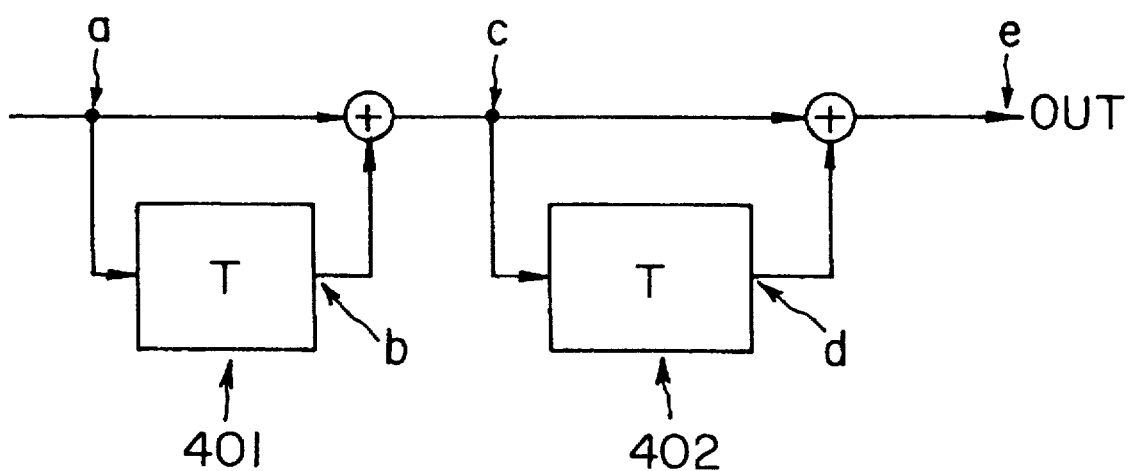
FIG. 15 is a block diagram showing a sum circuit for reproducing an impulse.
Figures 16A, 16B, 16C, 16D, 16E, 16F:
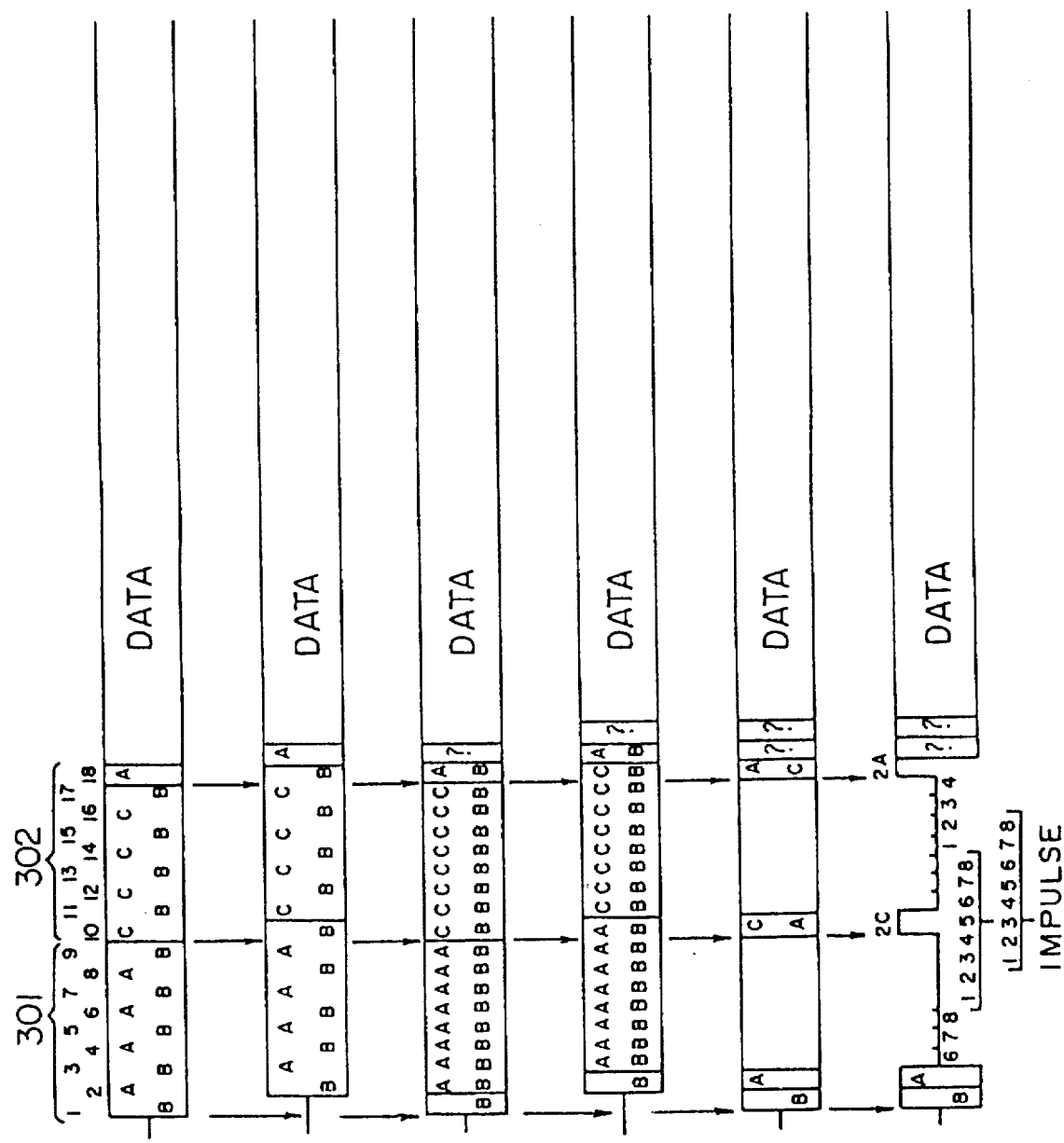
FIGS. 16(a), 16(b), 16(c), 16(d), 16(e) and 16(f) are diagrams illustrating reproduction of a training pattern.

It is to be noted that, while, in the embodiment described above, the patterns A and C forming a training pattern have such a signal point arrangement in a phase plane as shown in FIG. 8(a), they may have an alternative signal point arrangement in a phase plane as shown in FIG. 8(b) or 8(c).

Further, while the present invention is applied in the embodiment described above to a modulation and demodulation system which adopts the multiple point connection technique wherein a frequency band of a main channel is divided into a plurality of bands to transmit a plurality of data by way of a same circuit, the spirit of the present invention can naturally be applied similarly to modulation and demodulation systems of any other type.

The present invention is not limited to the specifically described embodiment, and variations and modifications may be made without departing from the scope of the present invention.

What is claimed is:

1. An initialization equalization method for a modulation and demodulation system including a transmission section which modulates and transmits training pattern data of a pattern prior to transmission of data therefrom and a reception section which receives and demodulates the training pattern data and performs initialization equalization processing of itself using the demodulated training pattern data, said method comprising the steps of:

a) generating, in the transmission section, training pattern data of a pattern having a first repeat pattern portion having a signal arrangement wherein signals whose phases of signal points are different by 180° from each other are arranged alternately, a first same phase signal arrangement portion following the first repeat pattern portion and having another signal arrangement wherein a signal having the same phase as that of the last signal of the first repeat pattern portion is arranged, a second repeat pattern portion following the first same phase signal arrangement portion and having a further signal arrangement wherein signals whose phases of signal points are different by 180° from each other are arranged alternately, and a second same phase signal arrangement portion following the second repeat pattern portion and having a still further signal arrangement wherein a signal having the same phase as that of the last signal of the second repeat pattern portion is arranged, modulating the thus generated training pattern data, and transmitting the modulated training pattern data to the reception section;

b) receiving and demodulating, in the reception section, the signal from the modulation means including the training pattern data;

c) delaying the demodulated current training pattern data by one symbol interval to obtain delayed training pattern data;

d) reproducing a first impulse using a first portion of the first repeat pattern portion of the current training pattern data;

e) reproducing a second impulse using a first portion of the first same phase signal arrangement portion of the current training pattern data and a last portion of the first repeat pattern portion of the delayed training pattern data;

f) reproducing a third impulse using a first portion of the second same phase signal arrangement portion of the current training pattern data and a last portion of the second repeat pattern portion of the delayed training pattern data; and g) initializing the reception section using the first, second and third reproduced impulses.

2. An initialization equalization method as claimed in claim 1, wherein said reception section reproduces a tone signal using portions of the pattern of the training data in which signals whose phases of signal points are different by 180° from each other are arranged alternately.

3. An initialization equalization method as claimed in claim 1, wherein said reception section reproduces a π/π signal using portions of the pattern of the training data in which signals whose phases of signal points are different by 180° from each other are arranged alternately.

4. An initialization equalization method as claimed in claim 1, wherein the pattern length of the second repeat pattern portion has information of a training time after a request-to-send is developed until a notification of a clear-to-send is transmitted.

5. An initialization equalization method for a modulation and demodulation system which includes a transmission section and a reception section between which main data and secondary data are communicated in a plurality of main channels for a plurality of main data and a secondary channel for secondary data obtained by frequency division, the transmission section modulates and transmits training pattern data of a pattern prior to transmission of the main data and the secondary data and the reception section receives and demodulates the training pattern data and performs initialization equalization processing of itself using the demodulated training pattern data, said method comprising the steps of:

a) generating, in the transmission section, training pattern data of a pattern having a first repeat pattern portion having a signal arrangement wherein signals whose phase of signal points are different by 180° from each other are arranged alternately, a first same phase signal arrangement portion following the first repeat pattern portion and having another signal arrangement wherein a signal having the same phase as that of the last signal of the first repeat pattern portion is arranged, a second repeat pattern portion following the first same phase signal arrangement portion and having a further signal arrangement wherein signals whose phases of signal points are different by 180° from each other are arranged alternately, and a second same phase signal arrangement portion following the second repeat pattern portion and having a still further signal arrangement wherein a signal having the same phase as that of the last signal of the second repeat pattern portion is arranged, modulating the generated training pattern data, and transmitting the modulated training pattern data to the reception section;

b) receiving and demodulating, in the reception section, the signal from the modulation means including the training pattern data;

c) delaying the demodulated current training pattern data by one symbol interval to obtain delayed training pattern data;
d) reproducing a first impulse using a first portion of the first repeat pattern portion of the current training pattern data;
e) reproducing a second impulse using a first portion of the first same phase signal arrangement portion of the current training pattern data and a last portion of the first repeat pattern portion of the delayed training pattern data;
f) reproducing a third impulse using a first portion of the second same phase signal arrangement portion of the current training pattern data and a last portion of the second repeat pattern portion of the delayed training pattern data; and
g) initializing the reception section using the first, second and third reproduced impulses.

6. An initialization equalization method as claimed in claim 5, wherein said reception section reproduces a tone signal using portions of the pattern of the training data in which signals whose phases of signal points are different by 180° from each other are arranged alternately.

7. An initialization equalization method as claimed in claim 5, wherein said reception section reproduces a π/π signal using portions of the pattern of the training data in which signals whose phases of signal points are different by 180° from each other are arranged alternately.

8. An initialization equalization method as claimed in claim 5, wherein the pattern length of the second repeat pattern portion has information of a training time after a request to send is developed until a notification of a clear-to-send is transmitted.

* * * * *